Sept. 28, 1943.　　　　G. F. BAHR　　　　2,330,187
CIGAR LIGHTER
Original Filed April 8, 1937
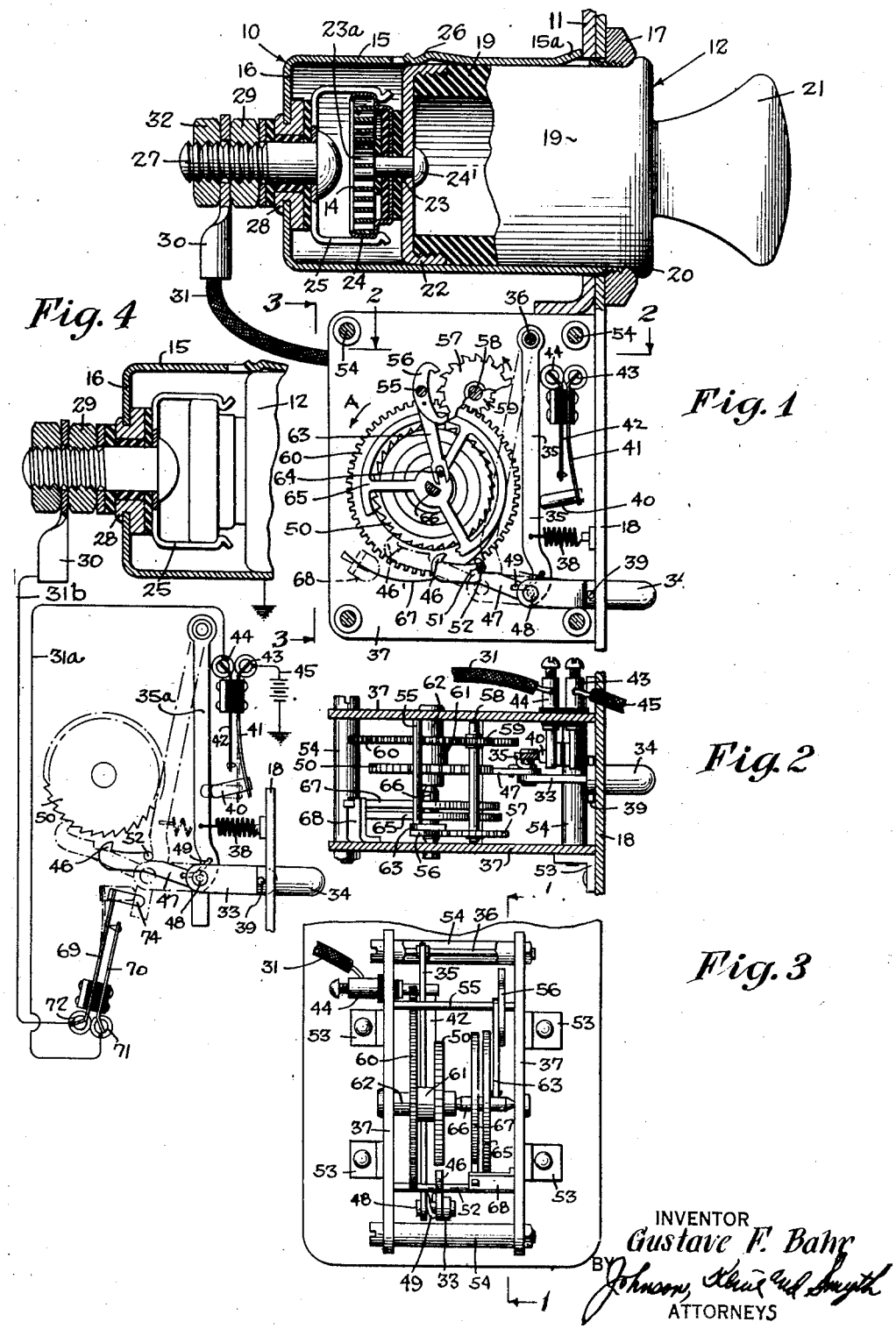
INVENTOR
Gustave F. Bahr
BY Johnson, Klarquist and Smyth
ATTORNEYS Patented Sept. 28, 1943

2,330,187

UNITED STATES PATENT OFFICE 2,330,187

CIGAR LIGHTER

Gustave F. Bahr, Bridgeport, Conn., assignor to Automatic Devices Corporation, Bridgeport, Conn., a corporation of Connecticut Original application April 8, 1937, Serial No. 135,691. Divided and this application February 23, 1940, Serial No. 320,304

12 Claims. (Cl. 200—33)

This invention relates to a control means and, more particularly, to a control means adapted for use with heating elements.

This application is a division of my copending application Serial No. 135,691, filed April 8, 1937.

The present invention is herein illustrated as applied to electric lighters, for cigars, cigarettes and the like, especially as used in automobiles, commonly comprise a holding device electrically served by connections, to a source of current to provide a circuit having a gap, and, in combination with the holder, an igniting unit adapted to be carried by and wholly removed from the holder for storage and use respectively. Such units have a heating element, and means are provided such that while the unit is on the holder the gap in the circuit may be closed and the heating element interposed therein for heating to a temperature suitable for use.

Previously proposed lighters of this kind have been so constructed that a circuit-closing means is rendered effective by relative movement between, on the one hand, the unit or a part of the unit movable thereon, and, on the other hand, the holder, or by relative movement between a part of the holder and the remainder of the holder and unit assembly; and a thermostatically controlled means has been provided for automatically operating to break the circuit for the heating element when the same reaches a predetermined temperature.

The present invention has been made with the idea of providing a controlled heating period for a heating element which avoids the necessity of providing thermostatically controlled means for breaking the circuit for the heating element after the latter has become heated.

According to the present invention, a nonthermostatic device is employed for breaking the circuit for the heating element at the conclusion of a predetermined time interval following closing of the circuit, and the circuit is so closed by a manually operable member placed at a convenient location, as close to or as remote from the heating element as may be desired, and which member, preferably, need not be maintained under manual control after the conclusion of its movement to effect circuit closing.

A feature of the invention is the provision of control means such that by a movement of a manually operable member, a normally open circuit is closed through the heating element, and a delayed action mechanism is released for operation to automatically break the circuit after a predetermined interval of time irrespective of the rate of heating of the heating element.

This delayed action mechanism preferably includes a member movable toward a position wherein it will break the circuit by operating a switch to separate its contacts, and thus movable at a speed slow enough to postpone opening of the circuit until the heating element has reached a useful temperature, and a means for insuring that opening of the circuit will result from a separation of the switch contacts at a higher speed than that of the movement of said member, thereby to avoid arcing at the contacts and consequently to prolong their life.

Another feature of the invention is the provision of a manually operable member for closing a normally open circuit, which member is manually operated in one direction to close the circuit and is automatically returned to normal position thereby to initiate operation of a delayed action mechanism for closing the circuit, and, in combination therewith, means for insuring that prior to release of the manually operable member for return to normal position from full manual operation the circuit will not be closed, thereby to insure that this member may not be manipulated in such a way as to result in maintaining the circuit closed for a longer period than measured by the operating cycle of the delayed action mechanism.

Other features and advantages will hereinafter appear.

In the accompanying drawing, which illustrates a now preferred embodiment:

Figure 1 is a view showing a holder in vertical axial section, an igniting unit, seen partially in side elevation and partially in section and supported by the holder in position to close a circuit through the heating element of the unit, and a circuit supervising means according to the invention with the parts thereof shown as viewed according to the line 1—1 of Fig. 3.

Fig. 2 is a horizontal section taken substantially on the line 2—2 of Fig. 1.

Fig. 3 is an elevational view, looking in the direction of the arrows 3—3 of Fig. 1.

Fig. 4 illustrates a modification of the circuit supervising means, according to which a normally closed switch is momentarily opened incidental to the manual closing of the normally open switch, and the first-mentioned switch is not allowed to close until the predetermined time interval during which the element is to be heated has started to run.

The control means of the present invention is illustrated as applied to a cigar lighter to control the heating of the heating element therein.

The cigar lighter shown in the accompanying drawing is one wherein the holder is of the so-called socket or well type, for use in automobiles, and comprising a tubular structure 10 for attachment to an instrument board panel 11, so that an igniting unit 12 may be placed therein for storage, and, when the heating element 14 of the unit is energized, the unit may be wholly removed from the holder for use.

The holder 10 as shown includes a metal sleeve 15 having at one end an open mouth and being closed at its other end by an integral transverse wall 16. At its open or front end this sleeve is externally threaded to carry a nut 17 for securing the sleeve to the panel. The side wall of the sleeve near its front end is provided with a plurality of tongues 15a lanced therefrom and adapted to engage the back of the panel 11 so that when the nut is tightened the sleeve will be drawn up against the rear of the panel and clamped tightly thereto.

In the present case, the controlling means for the circuit which energizes the heating element 14 when the igniting unit is on the holder is shown as adjacent to the holder, and as carried by a hanger connected thereto. This hanger as shown is in the form of a depending plate 18 apertured near its upper end for the insertion therethrough of the front end of the holder, thereby to permit the plate to be clamped in place between the panel 11 and the nut 17 when the latter is tightened to mount the holder on the panel.

The igniting unit shown comprises a tubular body 19 of insulated material, carrying a peripheral bead 20 for limiting inward insertion of the unit into the holder, and forward of this bead the body 19 is reduced in diameter and shaped to provide a knob 21 constituting a handle by which the unit is conveniently manipulated. The body 19 is externally threaded at its inner end and an internally threaded metal cap 22 is screwed thereon. This cap mounts a stud 23, to the head 23a of which is connected one end of a spirally wound resistance band, the other end of this band, which here constitutes the heating element 14, is connected to a metal cup 24 secured on and in concentric relation with the stud 23, by heading over of the stud at 24'. To avoid short-circuiting of the heating element 14, the cup is insulated from the stud 23 and from the cap 22 as illustrated.

According to the present invention, the igniting unit need have but a single position on the holder, whether the unit is merely to be stored on the holder, or positioned on the holder for energization of the heating element 14 preparatory to withdrawal of the unit for use. Such single position is shown in the drawing, and it is one, according to the structure illustrated, wherein the cup 24 is engaged with a contact 25 on the live side of the circuit, so that a circuit subdivision through the heating element, and including the contacts 25, and the parts of the unit consisting of the cup 24, the heating element 14, the stud 23, and the cap 22, is closed through the metal sleeve 15 of the holder and the panel 11. To insure good contact between the cap 22 of the unit and the sleeve 15 of the holder, the sleeve as shown has one or more tongues 26 lanced therefrom and resiliently biased inward for pressure engagement with the cap 22 when the unit is positioned in the holder as illustrated.

The contact 25 may also be an impositive detent for mounting the unit in the holder, and this is preferred, and illustrated. Also, as illustrated, two contacts 25 are provided, each being an end length of a generally U-shaped strip of resilient metal secured at the inner end of the holder by means of a threaded stud 27 passing through a metal bushing 28 carried by the transverse wall 16 at the inner end of the holder. The stud 27 is fixed in place by a primary nut 29, but the stud and this nut are insulated from the bushing as illustrated. A terminal clip 30 having a current supply wire 31 is connected to the stud and fixed thereon by a secondary nut 32. As shown, each contact 25 is part of a spring finger extending substantially parallel with the axis of the holder and near its front end each such finger is inwardly reentrantly bent; so that on inserting the unit 14 all the way into the holder these bends snap over the cup 24 to obtain good contact therewith and also to impositively detain the unit at full insertion in the holder, and so that when the knob 21 is pulled the unit is without difficulty drawn free of the contacts 25 for removal from the holder for use.

The holder 10, it will be noted, is of a comparatively short length, since the igniting unit 12 has but a single position therein, and the unit also is comparatively short, since it has no manually relatively movable parts.

According to the form of the invention shown in Figs. 1, 2 and 3, the energizing circuit for the heating element 14 of the igniting unit is closed when the unit is on the holder, by moving endwisely a manually operable member comprising a slide-bar 33 carrying at its front end a push button 34 in the form of a cylindrical block extending through a circular aperture in the plate 18 so as normally to project beyond the front face thereof as illustrated in Figs. 1 and 2.

On manually pushing in this button 34, a depending arm 35, hung on a fixed shaft 36 extended horizontally between a pair of side plates 37 rigidly rearwardly offset from from the plate 18, is rocked toward the left as viewed in Fig. 1, against the tension of the spring 38. Normally this spring 38 maintains the parts as shown, with the push button projected to the limit permitted by a cross-bar 39, and so that the arm 35 bears against the free end of a stud 40 fixed on the free end of a blade or leaf contact 41 to hold this contact separated from a point-carrying cooperant leaf contact 42. These resilient leaves are normally urged away from each other, so that the contacts are disconnected. The contacts 41 and 42, respectively, connected to binding posts 43 and 44, are insulated from each other as illustrated. The supply wire 31 extending to stud 27 of the holder as already described leads from the binding post 44. To the binding post 43 is connected a supply wire 45 from the source of current, the contacts 41 and 42 thus constituting a normally open switch in the circuit for the heating element 14, which switch is closed to initiate heating of the element 14 on manually moving the slide-bar 33 so as to swing the arm 35 toward the left.

This movement of the slide-bar 33 also increases the tension of the spring 38, and at the same time sends a pawl or dog 46, at the free end of an arm 47 which is rockable on a pivot 48 operatively connecting this arm, the slide-bar 33 and the arm 35, to the broken line position 46' of Fig. 1, for engagement with a ratchet 50.

This dog and ratchet engagement, it will be noted, occurs at the end of a full inward thrust of the slide-bar 33, and is then insured due to the fact that the arm 47 is urged upward by a spring 49.

The dog 46 is normally maintained clear of ratchet 50 by engagement of a notch 51 in the arm 47 with a stop 52.

The ratchet is part of a delayed action mechanism of the clock-work type, of which the driver is the spring 38, hereinafter called the main spring, acting through the arms 35 and 47, and thence through the ratchet 50, to cause the latter to rotate in the direction of the arrow A, on manual release of the push button 34.

This clock-work as shown is mounted in a framing which includes side plates 37, secured to the main plate 18 by brackets 53, and braced by sleeve and bolt horizontal spacers 54. The stop 52 is in the form of a horizontal rod extending between the side plates 37. Similarly extended is the fixed shaft 36 from which the arm 35 is suspended.

Another fixed horizontal shaft 55 has loose thereon a pallet 56 which with an escapement wheel 57 provides an escapement for limiting as predetermined the time to be consumed in rotation of the ratchet 50 in the direction of the arrow A effected by the main spring 38 on manual release of the push-button 34.

The escapement wheel 57 is fixed on an arbor 58 journalled at its opposite ends in the side plates 37, on which arbor is also fixed a pinion 59. Pinion 59 meshes with a gear 60 secured to a sleeve 61 also carrying the ratchet 50. This sleeve is revoluble on a fixed horizontal shaft 62 and suitably restrained against endwise shift thereon. The pallet 56 is fixed on the upper end of an arm 63 also hung on the fixed shaft 55, and the lower end of this arm is forked as shown in Fig. 1 for engaging a pin 64 offset from the hub of a balance wheel 65 on an arbor 66, which hub is partially cut away as shown in Fig. 1 to allow proper play for the lower forked end of the arm 63. A hair spring 67 is connected at its inner end to the arbor 66 and at its outer end to a bracket 68 on one of the side plates 37.

The invention as thus embodied includes, it will be noted, a novel and compact clock-work assembly having a driving gear, the gear 60, coaxial with the balance wheel of the escapement. As will be seen from the drawing, the arbor 66 is journalled at one end in one of the side plates 37 and at its other end in one end of the shaft 62 on which the gear 60 turns, which shaft extends only part of the way across the interior of the framing from its mounting in the other side plate 37.

As will now be understood, pushing in of the button 34 manually closes the switch including the normally separated contacts 40 and 41, and, this switch being at the only gap in the circuit with the igniting unit in the holder as in Fig. 1, energization of the heating element 14 of the unit is started. At the same time, however, initiation of the time cycle at the conclusion of which the circuit will again be opened, is prepared for, due to sending of the dog 46 from its full line position to its broken line position 46'. The running of this time cycle starts immediately on manual release of the push-button 34; the length of the cycle being a function of a prevised number of rockings back and forth of the pallet 56 relative to the escapement wheel 57, with each such rocking accompanied by partial spin of the balance wheel 65 in one direction or the other and allowing a tooth of the wheel to escape past the pallet, and with one such rocking tensioning the hair spring 67 and the next such rocking occurring in response to this tension; and the time cycle being completed only when the parts, under the action of the main spring 38, and the consequent pull of the dog 46 on the ratchet 50, become restored to the condition shown in full lines in Fig. 1.

A feature of the invention is the provision of a timing device having a switch-opening member, as the arm 35, which advances toward switch-opening position during running of the time cycle at a speed such that the circuit will remain closed long enough to energize the heating unit, but which is moved for switch opening at a higher speed, to effect quick separation of the switch contacts. In this connection, it will be noted that the notch 51 in the arm 47 has a substantially flat and somewhat extended bottom, between the free end of which and the front end of the arm the upper surface of the latter is inclined downward. According to this arrangement, the dog 46 is cleared from the ratchet 50 when, during the return movement of the arm 37 toward the right, the arm 37 has approached near to the stud 40. As soon as dog 46 is thus cleared away from the ratchet 50, the spring 38 is no longer restrained to a slow pull by the escapement, and snaps the arm 35 sharply to the position illustrated, thus quickly separating the contacts 40 and 41.

Referring now to Fig. 4, this shows diagrammatically the energizing circuit for the heating element of the igniting unit as already described, except that wires 31a and 31b are substituted for the wire 31 and a second switch is interposed in the circuit by way of these wires. The other parts shown in Fig. 4 are the same as those having corresponding reference numerals in Figs. 1 to 3, except that an arm 35a, having an extra length projected below the slide-bar 33, is substituted for the arm 35. In order to simplify the drawing, the only element of the delayed action mechanism shown is a portion of the ratchet 50.

While the switch including the contacts 41 and 42, which is the single switch of Figs. 1 to 3, is a normally open one, to be closed by inward thrust of the push button 34, the additional switch of Fig. 4 is so constructed that its contacts 69 and 70 are normally in engagement, so that this switch is a normally closed one. Such switch, however, is opened only if the slide-bar is thrust in sufficiently to allow closing of the switch including the contacts 41 and 42, and is held open only for such period of time as elapses between full insertion of the push button 34 and manual release thereof for return to normal position.

The purpose of this is to prevent having the time cycle during which the heating element of the unit 12 is to be energized, exceed a predetermined duration, as by failure to manually release the push button 34 immediately following a full inward thrust thereof.

As the invention is shown in Fig. 4, the wire 31a leads from the binding post 44 to a binding post 71 to which the contact 70 is connected, and the wire 31b leads from a binding post 72 to which the contact 69 is connected, to the terminal clip 30; thus placing the two switches in the circuit in series therein. The contact 69 is a blade or leaf like the contact 41, and the contact 70 is a point-carrying cooperant leaf contact like the contact 42. These leaves are resiliently biased toward each other, so that normally the contacts 69 and 70 engage. Fixed on the free end of leaf contact 69 is stud 74.

The parts as shown are so arranged that the lower end of the arm 35a, which is projected below the slide-bar 33, will be positioned as shown in broken lines to bear against the stud 74 and throw the parts 69 and 74 to cause opening of the switch including the same, incidental to closing of the switch which includes the contacts 41 and 42, by movement of the arm 35a toward the left sufficiently to release pressure on the stud 40 and so allow the contacts 41 and 42 to engage as shown in broken lines, on pushing in the button 34.

Immediately on manual release of the push button 34, however, which as above initiates an operation of the timing device, the circuit for energizing the heating element is closed, since then the switch including the contacts 69 and 70 again closes, while the switch including the contacts 41 and 42 remains closed. The heating circuit is maintained until, following release of the arm 47 from the ratchet 50 as already explained, the arm 35a strikes sharply against the stud 40 to separate the contacts 41 and 42, to restore the switch including the same to normally open position as shown in full lines, as the push button 34 returns to normal position.

Variations and modifications may be made within the scope of this invention and portions of the improvements may be used without others.

I claim:

1. An automatic control means for the circuit of a heating element including a manually operable member; a normally inoperative and inactive means including a timing means; means rendered operative by manual movement of said member for energizing the timing means and for returning said member to its original position under control of the timing means, upon manual release of said member; a normally open switch in said circuit closed during manual operation of said manually operable member; means for completing the circuit only in response to initial return movement of the manually movable member toward its original position; and means for opening the switch at the end of a predetermined time interval after completion of the circuit during the return movement of the manual member under control of the timing means.

2. A control means for a circuit comprising a switch in said circuit; means continually urging said switch to closed-circuit position; a manually operable member movable between a switch-engaging and a switch-releasing position; tensioning means urging said member to switch-engaging position to open the switch, said member being manually movable to switch-releasing position for closing the switch; timing means for retaining said member in switch-releasing position, said timing means releasing said member at the end of a predetermined time interval and said tensioning means thereupon moving said member suddenly to switch-engaging position to open the switch.

3. A control device for a circuit comprising a switch in said circuit; means continually urging the switch to closed-circuit position; a manually operable member movable between switch-engaging and switch-releasing positions; means urging said member to switch-engaging position for opening the circuit in opposition to the first-mentioned urging means, said member being manually movable to a switch-releasing position for closing the switch; timing means; means engaging said timing means upon motion of said member to switch-releasing position for preventing immediate return of said member to switch-engaging position, said timing means thereupon returning said member slowly toward switch-engaging position; means for releasing said member from said timing means at an intermediate point in said motion at the end of a time interval, said second urging means thereupon moving said member rapidly to switch-engaging position to open the switch.

4. A control means for a circuit comprising a switch in said circuit; means continually urging said switch to closed-circuit position; a manually operable member movable between a switch-engaging and a switch-releasing position; tensioning means urging said member to switch-engaging position to open the switch, said member being manually movable to switch-releasing position for closing the switch; normally inoperative timing means actuated by the latter urging means when said member is moved to switch-releasing position, said timing means retarding return motion of said member from switch-releasing to switch-engaging position and releasing said member at the end of a predetermined time interval and before said member has fully returned to switch-engaging position, the latter urging means thereupon moving said member at an increased rate of speed to switch-engaging position to open the switch.

5. A control device for a circuit comprising a switch in said circuit; yieldable means continually urging said switch to closed-circuit position; a manually operable member movable between switch-engaging and switch-releasing positions; tensioning means urging said member to switch-engaging position to open the switch in opposition to said yieldable means, said member being manually movable to switch-releasing position for closing the switch; normally inoperative timing means comprising a clockwork including a drive gear, balance wheel, and escapement; means engaging said driving gear when the manually operated member is moved to switch-releasing position and preventing immediate return of said member to switch-engaging position, said tensioning means thereupon actuating said timing means while returning said member slowly toward switch-engaging position under control of the timing means; means for releasing said driving gear-engaging means at a predetermined intermediate point in said return motion, at the end of a time interval, said tensioning means thereupon moving said member rapidly to switch-engaging position to open the switch.

6. A control means for an energizing circuit comprising a pair of switches in series in said circuit, a movable member engageable with said switches and manually operable to close one switch and open the other; means for imparting motion to the movable member; and means for successively closing the open switch and opening the closed switch at prevised points in the latter movement of said member.

7. A control means for an energizing circuit comprising a pair of switches in series in said circuit; a movable member manually operative to close one switch and open the other; automatic means for imparting motion to the movable member; timing means controlling operation of said automatic means; and means for successively closing the opened switch and opening the closed switch at prevised points in the latter movement of said member, the timing means rendering the interval between said successive operations substantially constant.

8. A control means for an energizing circuit comprising a pair of switches in series in said circuit; a movable member manually operative to close one switch and open the other; automatic means, energized by said manual movement, for imparting motion to the movable member; normally inoperative timing means energized by said automatic means during movement of the movable member thereby and controlling operation thereof; and means for successively closing the opened switch and opening the closed switch in response to the latter motion of said member, the timing means rendering the interval between said successive operations substantially constant.

9. A control means for an energizing circuit comprising normally inoperative timing means; a manually operable member movable from a normal position to a deep position, wherein it engages the timing means; means urging the movable member to the normal position, said means energizing and actuating the timing means while returning said member to normal position under control of the timing means; a pair of switches in series in said circuit, each normally urged to closed-circuit position, one of said switches being held open by the movable member when in normal position and closed when the movable member is moved from the normal position to the deep position, and the other switch being held open by the movable member upon movement into deep position and closing upon initial movement of said member from the deep position, whereby both of said switches are closed during the return motion of said member to normal position as timed by the timing means.

10. A control means for an energizing circuit comprising a normally inoperative timing means; a manually operable member movable from normal position to deep position, wherein it engages and energizes the timing means during movement to normal position; a pair of switches in series in said circuit, the first being held open by the movable member when in normal position and closed when the movable member is moved from normal position to deep position, and the second switch being held open by the movable member upon movement into deep position and closed during initial operation of the timing means incident to movement of said member from the deep position toward normal position under control of said timing means; and means for releasing said member from said timing means at a predetermined point in its return movement before completion thereof, said member thereupon moving suddenly to normal position to open the first-named switch, and said timing means controlling the interval between closure of the second switch and release of said member during said return motion, thereby determining the time interval of simultaneous closure of the two switches to complete the circuit.

11. A control means for an energizing circuit comprising a timing means; a manually operable member, automatically energizing said timing means after manual operation and upon manual release thereof; a normally open switch means in said circuit, said timing means controlling the operation of said member for successively closing and opening said switches at predetermined intervals after manual operation and release of said member.

12. A control means for an energizing circuit comprising timing means; a manually operable member movable from a normal position to energize said timing means, the latter controlling return motion of said member to normal position upon manual release thereof; normally open switch means in said circuit controlled by said manually operated member, said member successively closing and opening said switch means at predetermined points in its return motion under the control of the timing means after manual release of said member.

GUSTAVE F. BAHR.